Oct. 7, 1952 A. R. PANETTA 2,613,320

SYSTEM FOR USING OVERTONE ACTIVITY OF PIEZOELECTRIC CRYSTALS

Filed Dec. 2, 1948 2 SHEETS—SHEET 1

INVENTOR.
ALBERT R. PANETTA
BY
Hyde, Meyer, Baldwin & Doran
ATTORNEYS

Oct. 7, 1952 A. R. PANETTA 2,613,320

SYSTEM FOR USING OVERTONE ACTIVITY OF PIEZOELECTRIC CRYSTALS

Filed Dec. 2, 1948 2 SHEETS—SHEET 2

*INVENTOR.*
ALBERT R. PANETTA
*BY*
Hyde, Meyer, Baldwin & Doran
ATTORNEYS

Patented Oct. 7, 1952

2,613,320

UNITED STATES PATENT OFFICE 2,613,320

SYSTEM FOR USING OVERTONE ACTIVITY OF PIEZOELECTRIC CRYSTALS

Albert R. Panetta, Cleveland, Ohio, assignor to Electronic Research and Manufacturing Corporation, Cleveland, Ohio, a corporation of Ohio Application December 2, 1948, Serial No. 63,066

9 Claims. (Cl. 250—36)

This invention relates to improvements in a system for using the overtone activity of piezoelectric crystals, for example, quartz crystals.

One of the objects of the present invention is to provide a method and system for operating a piezoelectric crystal at one of its overtone frequencies wherein a portion, but not all, of the admittance of the inherent capacitance in shunt with the electrical equivalents $L_1C_1$ of the crystal is cancelled out by the paralleling of an inductance, or a network exhibiting inductive reactance at the operating frequency, across the crystal holder terminals. In this way the crystal may be operated at higher frequencies than have heretofore been possible.

Another object of the present invention is the provision of an inductance effect connected in parallel with a crystal and its holder wherein the value of the inductance effect is less than that required to entirely cancel out the capacitance effect due to the crystal holder, the associated wiring and any capacitance effects reflected back into the crystal circuit.

Another object of the present invention is the provision of an oscillator circuit for utilizing oscillation of a piezoelectric crystal at its nth overtone, wherein the crystal has an internal inductance $L_1$ and an internal capacitance $C_1$ and wherein the circuit has a capacitance C representing the capacitance of the crystal in position with its holder and the connections thereof included in the circuit including the capacitance of the wiring, tube, and so forth, and including a reactance in circuit with the crystal adapted to maintain approximately the same ratio of C to $C_1$ at the $n$th overtone as existed at the fundamental frequency of the crystal.

Other objects and advantages of the present invention will be apparent from the accompanying drawings and description and the essential features thereof will be set forth in the claims.

Figure 1:
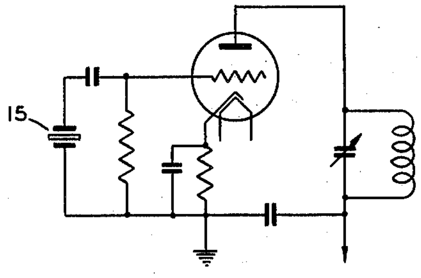
Fig. 1 is an electrical wiring diagram showing the usual coupling of a quartz crystal in the grid circuit of an amplifying tube which in turn has a plate tank circuit which may be utilized in any of the many ways familiar to those skilled in this art.
Figure 4:
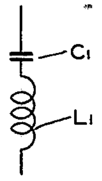

Fig. 4 represents the crystal portion of the diagram of Fig. 1, with the electrical equivalents $C_1$ and $L_1$ representing the capacitance and inductance effects present in the crystal. Those familiar with this art will understand that there is also an equivalent resistance $R_1$ in series with $L_1C_1$ but since the ratio of the inductive reactance of equivalent $L_1$ to this value of $R_1$ is so very great we will neglect the resistance in further calculations and discussions here shown except that the value of $R_1$ eventually becomes one of the limiting factors in obtaining operation at the higher order overtones of the crystal.

Figure 2:
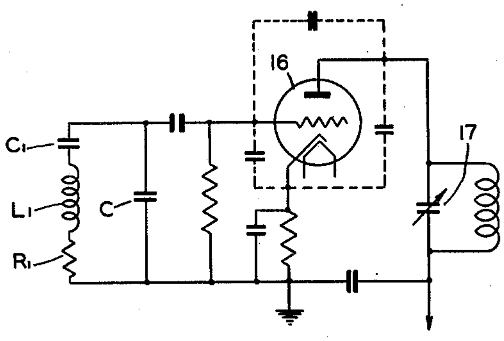
Fig. 2 is an electrical wiring circuit similar to Fig. 1 wherein the electrically equivalent values of the crystal and its holder have been indicated by separate electrical values and certain inherent capacitances have been indicated in broken lines.
Figure 3:
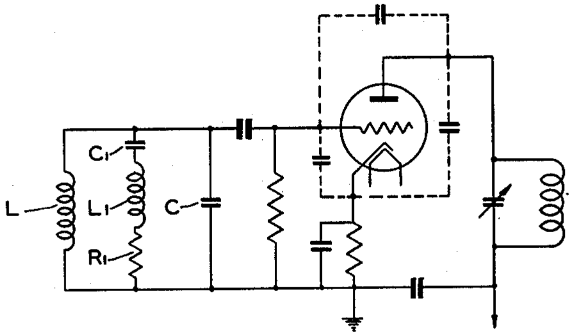
Fig. 3 is an electrical wiring diagram similar to Fig. 2, but wherein the coupling of my inductance effect in parallel with the crystal has been indicated.
Figure 7:
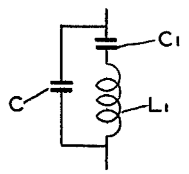
Figure 10:
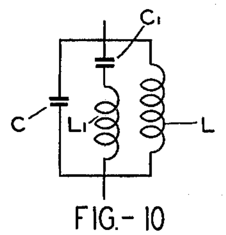
Figure 5:
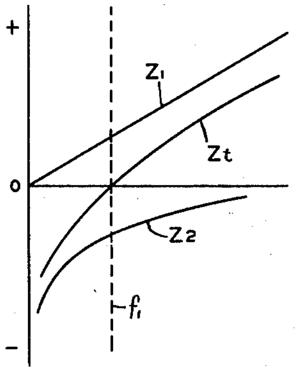
Figure 8:
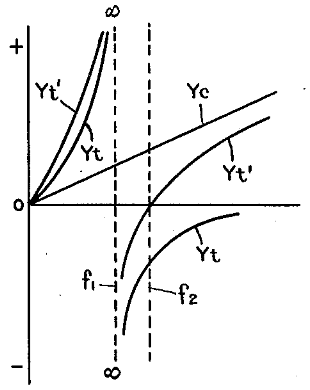
Figure 11:
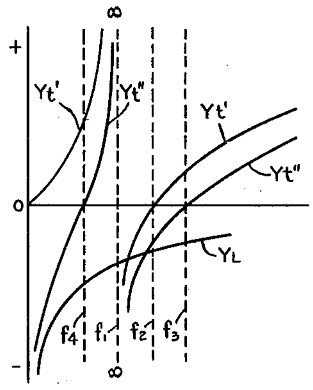
Figure 6:
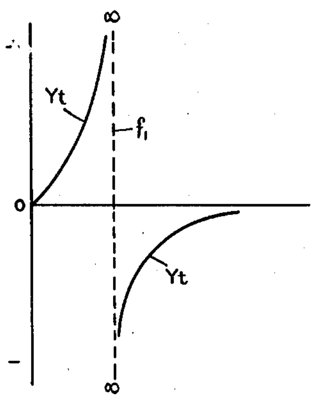
Figure 9:
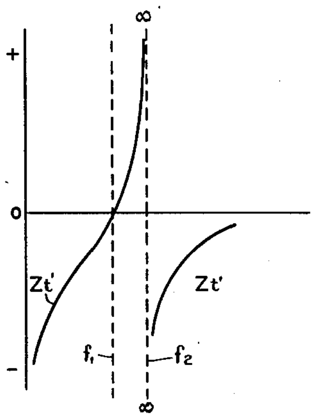
Figure 12:
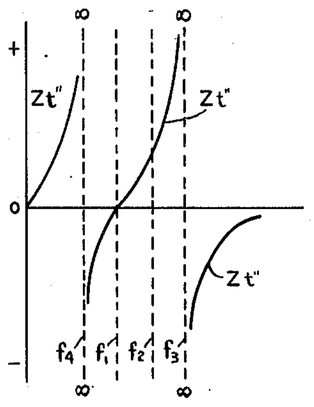

Fig. 5 is a graph plotting characteristic reactances of the circuit of Fig. 4;

Fig. 6 is a graph plotting the susceptances equivalent to the total impedance curve of Fig. 5;

Fig. 7 is a portion of a circuit taken from the left hand end of Fig. 2 and omitting the slight resistance $R_1$ of the crystal;

Fig. 8 is a series of graphs plotting the susceptances of the electrical values of Fig. 7;

Fig. 9 is a graph plotting the total reactance corresponding to the total susceptance curve of Fig. 8;

Fig. 10 is a diagram corresponding to the left hand portion of Fig. 3 but omitting the small resistance $R_1$ of the crystal circuit;

Fig. 11 is a graph plotting the electrical values for the susceptances of the various elements of Fig. 10; while Fig. 12 is a graph corresponding to the total susceptance curve of Fig. 11.

It should be understood that my invention is applicable to all crystal oscillator circuits wherein the crystal and its connected and inherent shunt capacities appear as a high or relatively high impedance where it is desired to use the fundamental or the overtone frequencies of the crystal, for instance, it may be used in the Pierce circuit, but I have chosen to show the same in Fig. 1 and the other circuits illustrated here as used in a standard crystal circuit.

It is well known that a crystal may be represented by its electrical equivalents and in Fig. 4, I have shown $C_1$ and $L_1$ as indicating the capacitance and inductance equivalents of the crystal 15 of Fig. 1. I have omitted the small resistance equivalent of the crystal for the reasons previously mentioned. In Fig. 5, I have shown graphically the reactance curve $Z_1$ for the inductance $L_1$ in a series resonant circuit while at $Z_2$ I have plotted the reactance of the capacitance $C_1$. The curve $Zt$ then represents the sum of the values $Z_1$ plus $Z_2$, since reactances may be added in a series circuit. I have drawn the broken line $f_1$ where the positive and negative values of $Z_1$ and $Z_2$ cancel each other or where the curve $Zt$ crosses the zero line. The line $f_1$ represents the series resonant frequency of the crystal for a given overtone. The curve $Z_1$ equals $j2\pi fL$. The curve $$Z_2=-j\frac{1}{2\pi fC}$$

In Fig. 6, the curve $Zt$ of Fig. 5 has been translated into a curve of the equivalent susceptances, in which the values are the reciprocals of the values on the reactance curve $Zt$ of Fig. 5. It will be noted that the two portions of the curve $Yt$ run off the chart at infinity along the line $f_1$.

In Fig. 7, the crystal is represented by the electrical values $C_1$ and $L_1$ as before and the value C has been added in parallel with the crystal as indicating the capacitance of the crystal holder, of the wiring and of the capacitance effect reflected back thru the amplifying tube 16 from the plate tank circuit connected with tube 16, including the tuning condenser 17. The curve $Yc$ of Fig. 8 is a plotting of the susceptance values of the condenser or capacitance value C of Fig. 7. $Yc=j2\pi fC$. The two-part curve $Yt$ is the same curve as so designated in Fig. 6. Since susceptances in parallel can be added, the curves $Yc$ and $Yt$ have been added in Fig. 8 to give the resultant curve $Yt'$. It will be noted that the curve $Yt'$ crosses the zero line where the values of $Yc$ and $Yt$ cancel each other. The vertical broken line $f_2$ drawn through this point indicates the parallel resonant frequency of the crystal plus its parallel capacity. In Fig. 9, the curves $Yt'$ of Fig. 8 have been translated into their equivalent reactance values from which the curves $Zt'$ are plotted.

At the fundamental frequency of the crystal, and more particularly at any of the overtones thereof, the value of C as explained in connection with Figs. 2, 7, 8, and 9, while it does not change much in actual value, appears larger in proportion to $C_1$ and $L_1$ because these latter values become smaller at the overtone frequencies of the crystal. As C thus becomes a larger capacitance value in comparison to the other values involved at the higher frequencies, the series resonant frequency of the crystal at an overtone and the parallel resonant frequency of the crystal plus the parallel capacitance tend to approach each other. What is more significant is the fact that at the higher crystal overtones the impedance across the crystal holder terminals becomes so low that oscillation can not be obtained. To those skilled in the art it is immediately apparent that high impedance in the grid circuit of an oscillator is necessary for oscillation and this impedance becomes lower as the ratio of $C/C_1$ increases. The paralleling of an inductance or an inductive reactance across the crystal holder terminals therefore increases the impedance across the crystal holder terminals making possible oscillation at the higher overtones where operation is otherwise impossible.

In Fig. 11, the susceptance characteristics of the inductance L have been plotted in the curve $Y_L$. The susceptance curves $Yt'$ have been transferred from Fig. 8 and represent the sum of the susceptances added as described in connection with Fig. 8. In Fig. 11, the susceptances of the curve $Y_L$ have been added to the susceptances of the two parts of $Yt'$, giving the resultant curves $Yt''$ as shown in Fig. 11. It will be noted that the curve $Yt''$ crosses the zero line at the right right hand side of the figure where $Y_L$ and $Yt'$ have equal but opposite values. This establishes the resonant frequency $f_3$ which is further removed from the series resonant frequency line $f_1$ than the previously established parallel resonant frequency line $f_2$, where the inductance L has not been added.

In Fig. 12, the susceptance values of the curves $Yt''$ of Fig. 11 have been changed into reactance values which are plotted on the curves $Zt''$ of Fig. 12. It will be noticed in Fig. 12 that there are two points $f_4$ and $f_3$ where the reactance $Zt''$ approaches infinity. Actually these two frequencies are very close together but $f_3$ has the desired qualities for constant crystal effect while $f_4$ is unstable. These may be very easily distinguished when tuning the circuit. At the frequency $f_4$, the frequency is unstable and there are very noticeable microphonics. At the frequency $f_3$ everything is very stable and there are no microphonics.

In setting up the circuits of Figs. 3 and 10, the values L and C should be tuned to near resonance but on the capacity side so that the resultant or effective capacitive reactance is higher than the reactance of C alone at the higher or overtone frequencies. The inductance or the network represented by the value L of Fig. 10 should not completely cancel out the capacitance across the crystal at the operating frequency because, in that case, the crystal would exhibit only its series resonance properties, that is, that of a short circuit at its resonant frequency or its overtones.

One of the advantageous applications of my invention will be apparent to those skilled in this art in connection with high frequency receivers or transmitters. For example, starting with an 11 megacycle crystal and utilizing my invention to operate the same at its ninth overtone, approximately nine times the fundamental frequency, one is enabled to reach 99 megacycles without using any frequency multiplier stages. In other words, my invention enables one to cut out two or three stages of frequency multiplication in building receivers or transmitters for high frequency use.

It is well known that if the internal or electrical equivalent inductance of a crystal is represented by $L_1$, measured in henries, and if the internal or electrical equivalent capacitance of the crystal is measured by $C_1$ in farads, then the natural or fundamental frequency of the crystal measured in cycles per second may be expressed by the equation $$F=\frac{1}{2\pi\sqrt{L\times C}}$$

Now if the crystal is to operate at its 9th overtone (approximately nine times the natural frequency of the crystal), this equation becomes $$9F=\frac{1}{2\pi\sqrt{\frac{L}{9}\times\frac{C}{9}}}$$

As mentioned previously herein, the value of C as used herein in connection with Figs. 2, 7, 8 and 9, does not change much in actual value but it appears larger at the higher harmonic frequencies of the crystal because $C_1$ and $L_1$ become smaller in value at the harmonic frequencies. The present invention provides a reactance in electrical circuit with the crystal and adapted to maintain approximately the same ratio of C to $C_1$ at the higher overtone as existed at the fundamental frequency of the crystal. For instance, at the 9th overtone of the crystal, the value of $C_1$ must be approximately one-ninth of its value at the fundamental.

What I claim is:

1. An oscillator circuit for utilizing oscillation of a piezoelectric crystal at its $n$th overtone, and including said crystal in its holder and the electrical equivalent of an inductance in shunt connection with said crystal, said inductance being so chosen as to cancel sufficient external capacitance of said crystal to reduce said external capacitance of the crystal to approximately $1/n$ times the external capacitance of the crystal at its fundamental frequency, and to provide controlled oscillation of said crystal at its $n$th overtone.

2. An oscillator circuit for utilizing oscillation of a piezoelectric crystal at its $n$th overtone, including said crystal in its holder, wherein said crystal has an internal inductance $L_1$ and an internal capacitance $C_1$ and wherein said circuit has a capacitance C representing the capacitance of said crystal in connection with its holder and the connections thereof included in said circuit, and including a reactance in circuit with said crystal adapted to maintain approximately the same ratio of C to $C_1$ at said $n$th overtone as existed at the fundamental frequency of said crystal.

3. In an oscillator circuit for utilizing oscillation of a piezoelectric crystal at its $n$th overtone, including said crystal in its holder and including a space discharge tube having at least a filament and grid and plate electrodes and including electrical connections between two of said electrodes and said crystal holder, wherein said crystal has an internal inductance $L_1$ and an internal capacitance $C_1$ and wherein said circuit has a capacitance C representing the capacitance of said crystal in connection with its holder and the connections thereof included in said circuit, the improvement comprising a reactance in circuit with said crystal adapted to maintain approximately the same ratio of C to $C_1$ at said $n$th overtone as existed at the fundamental frequency of said crystal.

4. The combination of claim 3 wherein said reactance comprises an inductance in shunt connection with said crystal, said inductance being so chosen as to cancel sufficient external capacitance of said crystal to reduce said external capacitance C of the crystal to approximately $1/n$ times the external capacitance of the crystal at its fundamental frequency and to provide controlled oscillation of said crystal at its $n$th overtone.

5. The combination of claim 3 including a condenser in series in said electrical connection between one of said electrodes and said crystal holder.

6. A piezoelectric crystal oscillator circuit at the $n$th overtone frequency of the crystal having the inherent circuit and crystal holder capacities electrically connected in parallel with said crystal, an inductive reactance connected in parallel with said crystal and sufficient to anti resonate with said inherent circuit and crystal holder capacities at a frequency slightly below the $n$th overtone frequency of said crystal, and said anti resonant circuit adjusted to such a value as to cause the tuned circuit impedance to be sufficiently large to provide suitable conditions for crystal controlled oscillations to take place in said oscillator circuit at a frequency very slightly above said $n$th overtone frequency.

7. A piezo electric crystal in an oscillator circuit operating as an equivalent inductance at its $n$th overtone, in which the inherent crystal holder capacity and connected external capacities of said circuit are connected in parallel with the crystal, an inductive reactance effectively coupled across the crystal which is sufficient with said inherent crystal holder capacity and connected external capacities to anti resonate to a frequency below the $n$th overtone frequency of said crystal, the resulting equivalent capacity of said anti resonant circuit combining with the equivalent inductance of the crystal slightly above its $n$th overtone to result in a high or relatively high impedance appearing across the crystal terminals at a frequency just slightly above the $n$th overtone frequency of said crystal.

8. In a piezoelectric crystal oscillator circuit, a means of increasing the impedance appearing across the terminals of said crystal at a frequency just slightly above its $n$th overtone comprising effectively connecting in parallel with said crystal an inductive reactance which anti resonates with the inherent crystal holder capacity and external connected capacities of said circuit to a frequency lower than the $n$th overtone frequency, the equivalent capacity of said anti resonant circuit and the equivalent inductance of said crystal at a frequency slightly above its $n$th overtone forming a second anti resonant circuit having increased impedance at a frequency just above the $n$th overtone frequency of said crystal.

9. A crystal in its oscillator circuit as defined in claim 7, wherein said inductive reactance is so chosen as to cancel sufficient crystal holder capacitive reactance and externally connected capacitive reactances as to reduce said parallel connected capacitive effects to approximately $1/n$ times the holder and parallel connected capacitive effects at its fundamental frequency, and to provide crystal controlled oscillation of said circuit at a frequency just slightly above the $n$th overtone frequency of said crystal.

ALBERT R. PANETTA.

REFERENCES CITED

The following references are of record in the file of this patent:

UNITED STATES PATENTS

| Number | Name | Date |
|---|---|---|
| 1,813,469 | Taylor | July 7, 1931 |
| 1,968,617 | Osnos | July 31, 1934 |
| 1,987,867 | Peterson | Jan. 15, 1935 |
| 2,455,824 | Tellier et al. | Dec. 7, 1948 |